US012709516B1

(12) United States Patent
Shaw et al.

(10) Patent No.: US 12,709,516 B1
(45) Date of Patent: Aug. 18, 2026

(54) PROCESS AND METHOD FOR UNIFORM MAINTENANCE FOR CONVEYANCE APPARATUSES

(71) Applicants: Sterling Jay Shaw, Elma, WA (US); Wendell R. Madison, Snohomish, WA (US)

(72) Inventors: Sterling Jay Shaw, Elma, WA (US); Wendell R. Madison, Snohomish, WA (US)

( * ) Notice: Subject to any disclaimer, the term of this patent is extended or adjusted under 35 U.S.C. 154(b) by 0 days.

(21) Appl. No.: 18/595,201

(22) Filed: Mar. 4, 2024

Related U.S. Application Data

(63) Continuation-in-part of application No. 17/476,075, filed on Sep. 15, 2021, now abandoned, which is a
(Continued)

(51) Int. Cl.
*B66B 5/00* (2006.01)
*B66B 1/26* (2006.01)
(Continued)

(52) U.S. Cl.
CPC .............. *B66B 5/0025* (2013.01); *B66B 1/26* (2013.01); *B66B 3/002* (2013.01); *G06Q 40/08* (2013.01); *G06Q 10/20* (2013.01); *G06Q 50/10* (2013.01)

(58) Field of Classification Search
CPC ....... B66B 5/0025; B66B 3/002; B66B 5/006; B66B 5/0018; B66B 5/0031;
(Continued)

(56) References Cited

U.S. PATENT DOCUMENTS 5,389,748 A * 2/1995 Burke ........................ B66B 1/18 187/382
6,543,583 B1 4/2003 Lence Barreiro et al.
(Continued)

FOREIGN PATENT DOCUMENTS

CA 2393395 A1 * 6/2001 ......... G06Q 10/1097
CA 2524227 A1 * 4/2006 ............. G06Q 40/03
(Continued)

OTHER PUBLICATIONS

ATIS "Elevator & Escalator Inspections", Oct. 6, 2022, https://web.archive.org/web/20221006192027/https://atis.com/inspections/ (Year: 2022).*

(Continued)

*Primary Examiner* — Gerardo Araque, Jr.
(74) *Attorney, Agent, or Firm* — Bold IP PLLC; Christopher Mayle

(57) ABSTRACT

A system and a process are provided for uniformly recording and storing compliance and maintenance information independent of specific conveyance apparatus service providers. Such a system and a process assists the jurisdiction and all parties involved in these service areas with documenting all work performed, documenting work that needs to be performed, accessing the necessary information to make sure the work is performed properly and timely, and enforcing the scheduled maintenance requirements for the conveyance apparatus to reduce liability for the parties responsible for the maintenance.

11 Claims, 2 Drawing Sheets

Related U.S. Application Data continuation of application No. 15/859,127, filed on Dec. 29, 2017, now abandoned.

(60) Provisional application No. 62/440,398, filed on Dec. 29, 2016.

(51) Int. Cl.

| | |
|---|---|
| ***B66B 3/00*** | (2006.01) |
| ***G06Q 10/20*** | (2023.01) |
| ***G06Q 40/08*** | (2012.01) |
| ***G06Q 50/10*** | (2012.01) |

(58) Field of Classification Search
CPC ........ B66B 5/0087; B66B 1/26; G06Q 40/08; G06Q 10/20; G06Q 50/10
See application file for complete search history.

(56) References Cited

U.S. PATENT DOCUMENTS

| | | | | |
|---|---|---|---|---|
| 7,991,688 | B2 * | 8/2011 | Phelan | G06Q 40/00 705/38 |
| 8,271,321 | B1 | 9/2012 | Kestenbaum | |
| 9,747,585 | B2 | 8/2017 | Eleid | |
| 10,787,341 | B2 * | 9/2020 | Herkel | B66B 9/00 |
| 2002/0029222 | A1 | 3/2002 | Key | |
| 2004/0094366 | A1 * | 5/2004 | Weinberger | B66B 5/0025 187/247 |
| 2004/0133452 | A1 * | 7/2004 | Denny, Jr. | G06Q 40/08 705/40 |
| 2004/0262387 | A1 | 12/2004 | Hart | |
| 2005/0144114 | A1 * | 6/2005 | Ruggieri | G06Q 40/04 705/37 |
| 2006/0053075 | A1 | 3/2006 | Roth et al. | |
| 2006/0053093 | A1 * | 3/2006 | Bonham | G06Q 10/10 |
| 2010/0070237 | A1 | 3/2010 | Yitbarek et al. | |
| 2010/0241481 | A1 | 9/2010 | Apostolides | |
| 2010/0299179 | A1 | 11/2010 | Alonso et al. | |
| 2012/0011073 | A1 | 1/2012 | Rajpathak | |
| 2013/0179214 | A1 | 7/2013 | Ainsworth et al. | |
| 2013/0246286 | A1 | 9/2013 | Welty et al. | |
| 2014/0252086 | A1 | 9/2014 | Talley | |
| 2014/0311257 | A1 * | 10/2014 | Hubbard | G01L 5/28 73/862.12 |
| 2015/0221051 | A1 | 8/2015 | Settino | |
| 2016/0012707 | A1 | 1/2016 | McKinley et al. | |
| 2016/0104126 | A1 * | 4/2016 | Eleid | G06Q 10/20 705/305 |
| 2016/0272467 | A1 * | 9/2016 | Ghadamossoltani | G08G 1/052 |
| 2016/0272471 | A1 * | 9/2016 | Jaipaul | B66F 3/46 |
| 2016/0357768 | A1 * | 12/2016 | Strong | G06F 16/29 |
| 2019/0027255 | A1 | 1/2019 | D'Amelia | |
| 2019/0152747 | A1 * | 5/2019 | Singaraju | G08B 21/02 |
| 2019/0177123 | A1 * | 6/2019 | Shah | B66B 5/0087 |
| 2019/0193991 | A1 | 6/2019 | Kohl | |
| 2020/0031627 | A1 | 1/2020 | Bezault | |
| 2020/0065691 | A1 | 2/2020 | Lovett et al. | |
| 2020/0130999 | A1 * | 4/2020 | Sun | B66B 5/0062 |
| 2020/0210918 | A1 | 7/2020 | Brand et al. | |
| 2021/0117584 | A1 | 4/2021 | Santarone et al. | |
| 2022/0067669 | A1 | 3/2022 | Griffin et al. | |
| 2022/0112051 | A1 * | 4/2022 | Blanchard | B66B 13/146 |
| 2022/0375551 | A1 * | 11/2022 | Patel | G06N 5/04 |
| 2022/0388810 | A1 * | 12/2022 | Ge | B66B 5/0018 |
| 2023/0289745 | A1 * | 9/2023 | Eleid | B66B 5/0087 |

FOREIGN PATENT DOCUMENTS

| | | | | |
|---|---|---|---|---|
| EP | 3498649 | A1 * | 6/2019 | B66B 11/0246 |
| EP | 3599204 | B1 | 1/2020 | |
| EP | 3764296 | A1 * | 1/2021 | B66B 5/0025 |
| EP | 3984936 | A1 * | 4/2022 | B66B 5/0031 |
| EP | 4177687 | B1 * | 2/2026 | G05B 19/41885 |
| JP | 2003-81552 | A | 3/2003 | |
| WO | WO-0141024 | A1 * | 6/2001 | G06Q 10/0875 |
| WO | WO-2011073212 | A1 * | 6/2011 | B66B 1/06 |
| WO | 2020140038 | A1 | 7/2020 | |

OTHER PUBLICATIONS

Metro Elevator, Inc. "Navigating Elevator Code Compliance: A Guide for Building Owners", Feb. 28, 2024 https://web.archive.org/web/20240228031207/https://metroelevatorinc.com/navigating-elevator-code-compliance-a-guide-for-building-owners/ (Year: 2024).*

Stanley Elevator "Elevator Maintenance Repair Inspection & Testing" Sep. 26, 2020, https://web.archive.org/web/20200926014257/https://www.stanleyelevator.com/elevator-service-repair-maintenance/ (Year: 2020).*

Schindler Elevator & Escalator Maintenance "Maintenance Services" Nov. 28, 2022, https://web.archive.org/web/20221128172208/https://www.schindler.com/en/services/maintenance.html (Year: 2022).*

Hong et al "Enabling Efficient Engineering Processes and Automated Analysis for Power Protection Systems," in IEEE Systems Journal, vol. 12, No. 1, pp. 340-349, Mar. 2018, doi: 10.1109/JSYST.2015.2497084 (Year: 2018).*

Uçar, Ayşegül & Karakose, Mehmet & Kırımça, Necim. (2024). Artificial Intelligence for Predictive Maintenance Applications: Key Components, Trustworthiness, and Future Trends. Applied Sciences. 14. 898. 10.3390/app14020898. (Year: 2024).*

Galt et al. "Data Standardization", New York University Law Review, 2019, https://www.nyulawreview.org/wp-content/uploads/2019/10/NYULAWREVIEW-94-4-GalRubinfeld-1.pdf (Year: 2019).*

Himes "What is AI in Predictive Maintenance" Apr. 11, 2023, https://www.ptc.com/en/blogs/iiot/what-is-ai-in-predictive-maintenance ?srsltid=AfmBOopFjfzBmNla3qVh8dXbzcDeFCFZLENBMtAG9WcvifTQDyA0moIT (Year: 2023).*

Lai et al (2022). Remote-control System for Elevator with Sensor Technology. Sensors & Materials, 34(5, Part 1), 1757-1769. https://doi.org/10.18494/SAM3827 (Year: 2022).*

Osha, "Hazards of Improper Elevator Controller Wiring," US Department of Labor, Archived Date Aug. 29, 2004, https:// web.archive.org/web/20040829075623/https ://www.osha.gov/dts/shib/shib081604.html (Year: 2004).

Almond, Russell & Kong, Augustine. (1995). Optimality Issues in Constructing a Markov Tree from Graphical Models. (Year: 1995).

Claude Boivin "The Peeling Algorithm" https://search.r-project.org/CRAN/refmans/dst/html/peeling.html, Printed Aug. 31, 2023 Google Archive date of Sep. 6, 2022 (Year: 2022).

R. G. Almond, "Fusion and Propagation of Graphical Belief Models: An Implementation and an Example." Order No. 9021784, Harvard University, Ann Arbor, 1990 (Year: 1990).

Henry D. Pfister, "The analysis of graph peeling processes," (2014), course notes available online:http://pfister.ee.duke.edu/ courses/ece590_gmi/peeling.pdf (Year: 2014).

Brownlee, Jason "A Gentle Introduction to Markov Chain Monte Carlo for Probability" Nov. 6, 2019, https://machinelearningmastery.com/markov-chain-monte-carlo-for-probability/ (Year: 2019).

Rinehart, Jesse et al. "Machine Learning Peeling and Loss Modeling of Time-Domain Reflectometry." arXiv: Data Analysis, Statistics and Probability (2018): n. pag. (Year: 2018).

Kim, J., Yu, D., Lim, J. et al. A peeling algorithm for multiple testing on a random field. Comput Stat 33, 503-525 (2018). https:// doi.org/10.1007/s00180-017-0724-4 (Year: 2018).

* cited by examiner

PROCESS AND METHOD FOR UNIFORM MAINTENANCE FOR CONVEYANCE APPARATUSES

CROSS-REFERENCE TO RELATED APPLICATIONS

This application is a continuation-in-part of U.S. Non-Provisional application Ser. No. 17/476,075, filed Sep. 15, 2021, which is a continuation of U.S. Non-Provisional application Ser. No. 15/859,127, filed Dec. 29, 2017, which claims priority to U.S. Provisional Application No. 62/440,398, filed Dec. 29, 2016, the contents of which are incorporated herein in their entirety.

TECHNICAL FIELD

The overall field of the invention is distribution of safety and compliance information. More specifically, the present invention is a process and system for storing safety maintenance and compliance information for conveyance means and means of enforcing the safety maintenance and compliance information.

BACKGROUND

Human conveyance apparatuses such as elevators, escalators, man lifts, dumb waits, material lifts, moving walkways, and all other permanent vertical and horizontal transportation options are incorporated into most if not all buildings in modern times to allow for quicker transportation between floors, but also to allow those who are not able to use stairs to gain access to the same areas as those who can. With the increase in use of these conveyance means, there has been an increase to make sure that they are all safe and maintained properly to reduce the possibility of serious injury to the occupants and those around them.

Modern buildings often have multiple conveyance apparatuses. Each of those conveyance apparatuses has unique conveyance technology, initial quality, complexity, age, frequency of use, maintenance history, etc. It is crucial therefore to incorporate all the information unique to the specific conveyance apparatus in scheduling various maintenance intervals in order to guarantee the safe operation of the conveyance apparatus.

In addition, those conveyance apparatuses are installed and/or maintained by different manufacturers and service providers. Their maintenance data of one conveyance apparatus are proprietary to the specific service provider that maintains the conveyance apparatus, and such data are incompatible with the maintenance data of other conveyance apparatus maintained by a different service provider. When the owner of a building wants to retrieve information about the conveyance apparatuses within the building, the owner must rely on the service providers of the conveyance apparatuses to retrieve maintenance data. And once the maintenance service contract between the building owner and the service provider expires and is no longer extended, the building owner risks losing access to his or her conveyance apparatuses, because the maintenance data of those conveyance apparatuses remain proprietary to the service provider. This prohibits building owners from keeping timely maintenance data about the owner's own conveyance apparatuses.

Additionally, in some cases such as where emergency maintenance is needed, other technicians not affiliated with the contracted service provider may be brought in to work on conveyance apparatuses, and their maintenance work may not be properly recorded and updated on the maintenance data held by the service provider. This lack of record is not beneficial to technicians, either, because their work hours and compensation may not be properly documented and calculated.

Moreover, municipalities, state governments, national governments and other enforcement authorities impose different regulations on conveyance apparatuses that are scattered all over the world, so that it becomes a time-consuming, daunting task to keep conveyance apparatuses in different locations in compliance with different regulations. From the point of government officials enforcing compliance with regulations on building owners, assessing compliance or violation of different conveyance apparatuses is also a daunting task and may result inaccurate assessment, because the government official does not have direct access to the maintenance data and should rely on the paperwork provided by the building owner or its service provider. This poses a potential risk of injuries or deaths of many people caused by poorly maintained conveyance apparatuses.

Accordingly, it would be beneficial to provide building owners with a uniform platform to control the maintenance of conveyance apparatuses that may be accessible to all interested parties including building owners, service providers, technicians, unions, and governments of different jurisdictions. It would also be beneficial to provide such a uniform platform that customizes the maintenance intervals in compliance with various regulations of conveyance apparatuses having unique conditions and automatically alerts the building owner of various maintenance schedules.

SUMMARY

It is therefore the object of the present invention to create a system that is uniform across all interested parties. A predetermined algorithm automatically calculates an optimum, compliant maintenance schedule for each conveyance apparatus based on the model, age and environment conditions so that there is less opportunity for these conveyance apparatuses to miss their scheduled maintenance and as a result reduce the possibility for entrapment, accidents, and other safety related issues to all the users of the device.

The present invention is designed to take the current documenting system to another level by incorporating all parties involved in a single system that tracks all necessary and important information related to the conveyance apparatuses. This creates a more transparent and uniform docketing system which will result in all parties operating at their most efficient.

Each interested party is given different levels of access and rights to the data stored in the system. Using this system, a building owner or a maintenance company takes full control of all the maintenance stored in one place without having to turn to a different maintenance company for each conveyance apparatus. Technicians can access one system to inspect, repair and update the conditions of many different conveyance apparatuses instead of having to use different formats for different conveyance apparatuses.

This system also provides a uniform system for government officials in different jurisdictions so that they can have limited access to the system and retrieve compliance data tailored to the different requirements and formats. A union is also allowed access to the system to retrieve the union workers' timesheets and/or working hours.

DETAILED DESCRIPTION

Figure 1:
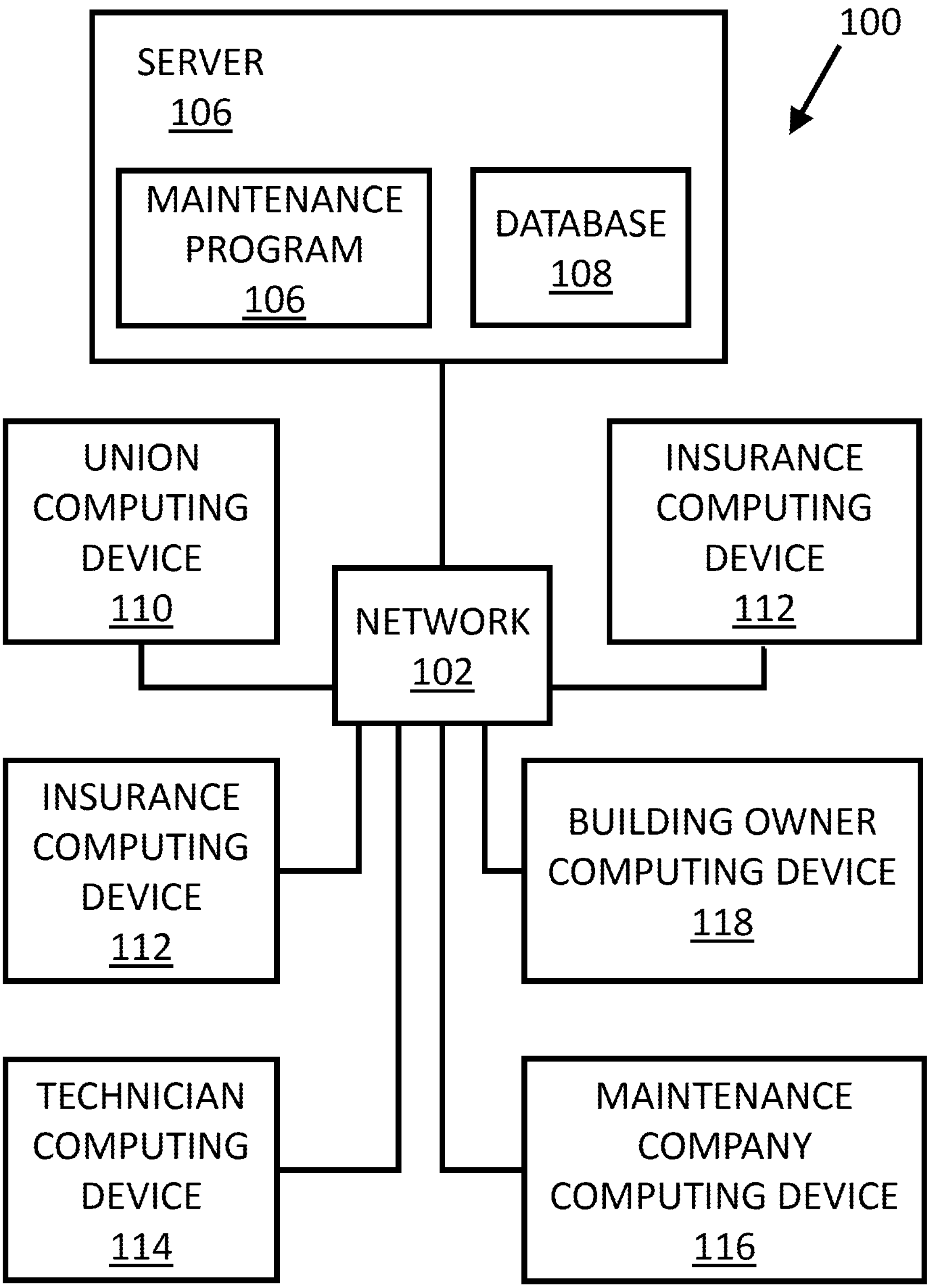
FIG. 1 depicts a block diagram of a computing environment, in accordance with one embodiment of the present invention.

In the Summary above, this Detailed Description, the Claims below, and in the accompanying drawings, reference is made to features of the invention. It is to be understood that the disclosure of the invention in this specification includes all possible combinations of such features. For example, where a feature is disclosed in the context of an aspect or embodiment of the invention, or a claim, that feature can also be used—to the extent possible—in combination with and/or in the context of other aspects and embodiments of the invention, and in the invention, generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25 and upper limit is 100, and includes both 25 and 100.

There currently exists a need for recording and keeping compliance and maintenance information for conveyance apparatuses independent of service providers. As used herein, the "conveyance" or "conveyance apparatuses" refer to elevators, escalators, man lifts, dumb waits, material lifts, moving walkways, and all other permanent vertical and horizontal transportation options.

In some embodiments, a system and a process are provided for uniformly recording and storing compliance and maintenance information independent of specific conveyance apparatus service providers. Such a system and a process assists the jurisdiction and all parties involved in these service areas with documenting all work performed, documenting work that needs to be performed, accessing the necessary information to make sure the work is performed properly and timely, and enforcing the scheduled maintenance requirements for the conveyance apparatus to reduce liability for the parties responsible for the maintenance. Such a system and a process assist in creating an open and transparent system for communication and operations and promotes sharing relevant information with consumers, subscribers, and the government. Some embodiments also provide a data collection, retention, and distribution system that is more accurate and up-to-date than the currently existing systems.

The system and the process will compile information on and track all maintenance, repairs, modernizations, upgrades, service and inspections as required by existing codes and will be expandable to include new and updated code compliance as established by jurisdictions. The historical data will come from existing physical and digital information as it exists. The information will undergo a process of digital scanning and coding which will convert it to new formats compatible with the program. In some embodiments, the scanning is performed by the technicians themselves. In additional embodiments, the scanning is performed by a third party, such as a contractor or subcontractor. As new data is created, it will be entered into the program from individual conveyances at their physical location or via digital downloads. The system and the process will store, manage and track the data and can create an event calendar to notify subscribers of current equipment status, beginning and completion of maintenance and repair tasks, past due, pending and future compliance issues/concerns determined by a series of algorithms, safety requirements and provide consequences of non-compliance and correction requirements and penalties.

The process starts with a "learning" algorithm which creates weighted algorithms using previous compliance issues/concerns, manufacturer, maintenance provider and jurisdictional criteria as well as any other previously entered data. These algorithms will develop maintenance requirements that meet and exceed all manufacturer, jurisdictional and contract requirements for any conveyance to predict and preempt future compliance issues. Additional criteria then will be introduced to develop new opportunities for monitoring and reporting maintenance. As the system matures, the complexity of the software and algorithms increase to provide results as required The system and the process will have multiple levels of access that subscribers and jurisdictions can purchase, with security levels reserved for local, state and federal jurisdictions. The current physical maintenance, testing, repair and compliance forms, logs will be duplicated in a digital format that will be accessed using a unique login and password. Subscribers will have the ability to select the level of information they choose for the information they want whereby the information will be filtered and presented to the subscribers through various different user platforms and presentations. As maintenance tasks, safety inspections, call backs, repairs, modernizations, upgrades are completed, the technician(s), mechanics, inspectors will document tasks and status via the electronic collection device. Upon log out/off, the information will be uploaded to the main server/storage device processed and made available for distribution.

The system and the process are capable of tracking real labor hours against projected labor hours and predicting labor requirements for current and future maintenance labor requirements. This labor calculation can be used by labor unions, bargaining units, maintenance companies, building owners, building managers, property management companies, inspection companies, governing jurisdictions and others as requirements are identified. As the program will track all information as entered in real time, inspection companies and jurisdictions schedule inspections efficiently and track compliance by multiple variables. The program also has an integrated enforcement/penalty feature that is activated when a conveyance apparatus is not properly maintained.

The enforcement/penalty may be a fine, a license suspension, or ceasing the operation of the application or conveyance apparatus until the necessary work has been performed whereby a signal is transmitted to the conveyance apparatus automatically and it will only be active once one or more criteria has been met. In some embodiments, the enforcement/penalty is assessed from the date of the infraction. In some embodiments, the enforcement/penalty is assessed from the date of discovery. In additional embodiments, the enforcement/penalty has a predetermined warning period applied in which to allow the appropriate party to correct the error within a predesignated time period. The suspension or fine may be transmitted automatically or manually through the application as well as physical mail once a variation is detected. In further embodiments the presentation displayed to the subscribers may be altered based on the fine or suspension.

These enforcements and penalties may be set by the regulations related to the devices, state laws, federal laws, or the like which are stored in the system databases and brought up for comparison after determining the location of the user and the conveyance apparatus. For example, Occupational Safety and Health Administration (OSHA) and Congressional Standards Committee may set forth the laws and rules related to the devices.

This system that is accessible by all parties allows jurisdictions to identify trends and potential concerns by any of the previously mentioned attributes. Due to this the information and format will be stored in a standardized format even though received from different types of computing devices and apparatuses, the conclusions of inspectors and alternate means of inspection (3rd party inspection companies) will have the same level of accountability. The program will provide extensive inspection requirements to labor organizations allowing improved training and qualification programs. This will influence the number of qualified labor pool applications and apprentice opportunities. Jurisdictions, through the system are able to order reports to validate compliance vs the current physical inspection to determine compliance whereby the reports may be automatically or manually transmitted to them through an application or web interface, email, text, or through physical mail.

The program will also create a searchable system that can identify specific attributes such as but not limited to conveyance number, equipment manufacturer, property manager, building owner, property management company, maintenance company, inspection company, insurance company, maintenance technician, city, state, zip code, date range, union or non-union maintenance company. This may be further utilized for predicted future compliance issues/concerns whereby a user may search for previous conveyance apparatuses which have had similar problems so they may better provide diagnosis to preempt the future compliance issues/concerns. In some embodiments, additional information such as building owners, building managers, jurisdiction, past accidents, past faults, and other information that is relevant to each conveyance apparatus.

The program capabilities will extend to compliance enforcement. In this capacity, on behalf of all parties including jurisdictions, the program will be able to assess penalties for non-compliance, issue citations and provide information and means for collection of monetary penalties. In some embodiments, the requirements and standards are based on A17.1 maintenance control criteria which is the international code regulating all vertical transportation. This code relates to the time frames required to complete each task, the schedule for completing the tasks and the like. In additional embodiments, the information is based on other maintenance control criteria set by a governing body.

FIG. 1 depicts a block diagram of a computing environment 100 in accordance with one embodiment of the present invention. FIG. 1 provides an illustration of one embodiment and does not imply any limitations regarding the environment in which different embodiments may be implemented. In the depicted embodiment, computing environment 100 includes network 102, server 104, union computing device 110, insurance computing device 112, technician computing device 114, maintenance company computing device 116, building owner computing device 118, and government computing device 120. Computing environment 100 may include additional servers, computers, or other devices not shown.

Network 102 may be a local area network (LAN), a wide area network (WAN) such as the Internet, any combination thereof, or any combination of connections and protocols that can support communications between sever 104, union computing device 110, insurance computing device 112, technician computing device 114, maintenance company computing device 116, building owner computing device 118, and government computing device 120. Network 102 may include wired, wireless, or fiber optic connections.

Server 104 may be a management server, a web server, or any other electronic device or computing system capable of processing program instructions and receiving and sending data. In some embodiments, server 104 may be a laptop computer, tablet computer, netbook computer, personal computer (PC), a desktop computer, or any programmable electronic device capable of communicating with the union computing device 110, the insurance computing device 112, the technician computing device 114, the maintenance company computing device 116, the building owner computing device 118, and the government computing device 120 via network 102. In other embodiments, server 104 may represent a server computing system utilizing multiple computers as a server system, such as in a cloud computing environment.

In another embodiment, server 104 represents a computing system utilizing clustered computers and components to act as a single pool of seamless resources. In the depicted embodiment, server 104 includes maintenance program 106 and database 108. In other embodiments, server 104 may include any combination of maintenance program 106 and database 108 as well as various modules stored in database 108 to conduct various activities related to the system. Modules may use various automatic algorithms through various computing devices and server 104 to provide various functionality such as one or more algorithms to check lists created per apparatus referencing unique conveyance attributes.

Server 104 may have a safety code conveyance compliance documentations system SCCCDS module for referencing documents provided by the manufacturer, applicable codes, environmental conditions, verified use and age of apparatus for each design of any apparatus system, subsystem, component, or function that outlines how conveyance compliance and safety is achieved. This module utilizes a logarithms algorithm for the transition of numbers and the unique Alpha/Numerical system assigned to each convenience apparatus. Reports developed in the SCCCDS module, allow for unique data capture customizable to each subscriber or user.

Server 104 may have a memory zone maintenance (MZM) module for learning from past information utilizing data for future features, whereby the various connected computing devices run a peeling algorithm, for the safe use of transport apparatus, or any machine-to-machine communication. The peeling algorithm utilizes a method for reducing a graph by systematically removing certain elements (like nodes or edges) based on specific criteria in the comparison to previous conveyance apparatuses.

Server 104 may have a maintenance equipment requirement's (MER) module that is used to classify equipment, by building data trees and process analysis algorithm flow charts, that will store info from the past & future maintenance tasks, required by Big Data. Server 104 may have one or more modules to receive data from one or more sensors on conveyance apparatus and translate it into code suitable for one or more databases.

Databases 108 may be a repository that may be written to and/or read by maintenance program 106. Information gathered from maintenance program 106 may be stored in database 108. Such information may include compliance information, maintenance information, maintenance schedules, maintenance manuals, and other relevant information about the specific conveyance apparatus that is necessary to meet the compliance and maintenance standards and requirements. In one embodiment, database 108 is a database management system (DBMS) used to allow the definition, creation, querying, update, and administration of a database(s). In the depicted embodiment, database 108 resides on server 104. In other embodiments, database 104 resides on another server, or another computing device, if database 104 is accessible to the union computing device 110, the insurance computing device 112, the technician computing device 114, the maintenance company computing device 116, the building owner computing device 118, and the government computing device 120. In other embodiments, database 108 stores all the necessary maintenance criteria, such as A17.1 MCP for the union computing device 110, the insurance computing device 112, the technician computing device 114, the maintenance company computing device 116, the building owner computing device 118, and the government computing device 120 to access. In one or more embodiments information may be stored on multiple databases 108 for each of the conveyance apparatus, the type of conveyance apparatus, or model of conveyance apparatus.

Maintenance program 106 operates to gather, store, manage, process, distribute, analyze, categorize, determine, and then provide predetermined information to each party involved in the maintenance and compliance process of the specific conveyance apparatus. In one embodiment, this information is stored on database 108. In the depicted embodiment, maintenance program 106 is located on server 104 and utilizes network 102 to communicate with the union computing device 110, the insurance computing device 112, the technician computing device 114, the maintenance company computing device 116, the building owner computing device 118, the government computing device 120, or various other computing devices.

In one embodiment, maintenance program 106 resides on the building owner computing device 118. In other embodiments, maintenance program 106 resides on another server or computing device, provided maintenance program 106 has access to database 108, the union computing device 110, the insurance computing device 112, the technician computing device 114, the maintenance company computing device 116, the building owner computing device 118, and the government computing device 120. The various computing devices may connect to a cloud base/go computing system on the server which allows for Big Data (BD), Data mining (DM), and Machine Learning (ML), which has created the Data-Driven maintenance system (DDMS). Computing devices may run an encrypt match algorithm to create code language for the system.

Union computing device 110 may be a desktop computer, laptop computer, tablet computer, netbook computer, personal computer (PC), a desktop computer, mobile device, or any programmable electronic device capable of communicating via network 102 under the philosophy of internet of things. In other embodiments, union computing device 110 may be any electronic device or computing system capable of sending and receiving data, and communicating with server 104, the insurance computing device 112, the technician computing device 114, the maintenance company computing device 116, the building owner computing device 118, and the government computing device 120 via network 102.

Insurance computing device 112 may be a desktop computer, laptop computer, tablet computer, netbook computer, personal computer (PC), a desktop computer, mobile device, or any programmable electronic device capable of communicating via network 102. In other embodiments, insurance computing device 112 may be any electronic device or computing system capable of sending and receiving data, and communicating with server 104, the union computing device 110, the technician computing device 114, the maintenance company computing device 116, the building owner computing device 118, and the government computing device 120 via network 102.

Technician computing device 114 may be a desktop computer, laptop computer, tablet computer, netbook computer, personal computer (PC), a desktop computer, mobile device, or any programmable electronic device capable of communicating via network 102. In other embodiments, technician computing device 114 may be any electronic device or computing system capable of sending and receiving data, and communicating with server 104, the union computing device 110, the insurance computing device 112, the maintenance company computing device 116, the building owner computing device 118, and the government computing device 120 via network 102.

Maintenance company computing device 116 may be a desktop computer, laptop computer, tablet computer, netbook computer, personal computer (PC), a desktop computer, mobile device, or any programmable electronic device capable of communicating via network 102. In other embodiments, maintenance company computing device 116 may be any electronic device or computing system capable of sending and receiving data, and communicating with server 104, the union computing device 110, the insurance computing device 112, the technician computing device 114, the building owner computing device 118, and the government computing device 120 via network 102.

Building owner computing device 116 may be a desktop computer, laptop computer, tablet computer, netbook computer, personal computer (PC), a desktop computer, mobile device, or any programmable electronic device capable of communicating via network 102. In other embodiments, building owner computing device 116 may be any electronic device or computing system capable of sending and receiving data, and communicating with server 102, the union computing device 108, the technician computing device 110, the insurance computing device 112, the maintenance company computing device 114, and the government computing device 118 via network 102.

Government computing device 120 may be a desktop computer, laptop computer, tablet computer, netbook computer, personal computer (PC), a desktop computer, mobile device, or any programmable electronic device capable of communicating via network 102. In other embodiments, government computing device 120 may be any electronic device or computing system capable of sending and receiving data, and communicating with server 104, the union computing device 110, the insurance computing device 112, the technician computing device 114, the maintenance company computing device 116, and the building owner computing device 118 via network 102.

Figure 2:
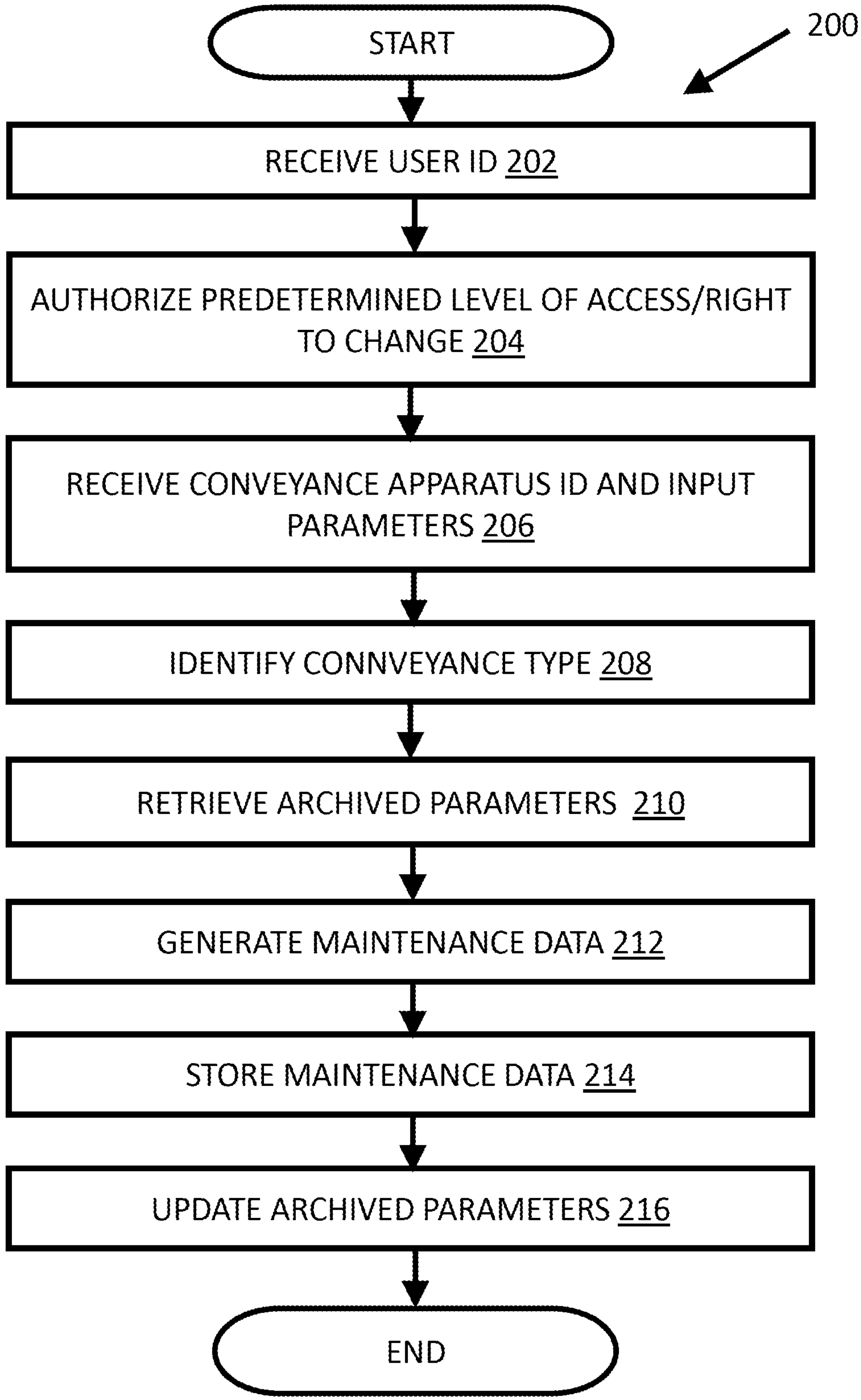
FIG. 2 depicts a flowchart of the program operating within the environment of FIG. 1, in accordance with one embodiment of the present invention.

FIG. 2 depicts a flowchart 200 of maintenance program 106, executing within the computing environment 100 of FIG. 1, in accordance with an embodiment of the present invention.

In step 202, when a user logs in to the maintenance program 106, the maintenance program 106 receives a user identification, or user ID. If the user ID entered by the user does not match one of the user IDs stored in the database 108, the maintenance program 106 refuses the user to login. A user may be a technician, maintenance company, building owner/manager, government official, union, insurance company, or any other entity that may be reasonably required for the maintenance of conveyance apparatuses. As used herein, the "union" refers to qualified personnel in a labor organization.

In one embodiment, the user is permitted to log in using a designated route. When the user logs in, the maintenance program 106 records the user ID, time of login, date of login, as well as the location of the user based on the global positioning system (hereinafter "GPS") and the like. In additional embodiments, the user is permitted to log in on site (at the location of the specific conveyance apparatus). When the user logs in on-site, the maintenance program 106 records similar information to the login on their designated route, including, the name of the building or store they logged in from and the like. The locating of the user may be performed by the scanning of a bar code or electronic product coding at the conveyance apparatus, radio frequency identification, received signal strength indication, or other means to determine the location of the user now and which could be developed.

In step 204, the maintenance program 106 then checks from the database 108 the user's level of authorization to access and/or alter the database 108. The levels of authorization to access and/or alter the database 108 are predetermined, and such information is stored in the database 108. The predetermined levels of authorization may represent different levels of authorization to access and alter for technicians, maintenance companies, building owners/managers, government officials, union, or insurance companies. For example, a technician may enter and/or alter information such as inspection data, repair data, number of hours worked on a specific conveyance apparatus. A government official may have access to the compliance data of a specific conveyance apparatus in a specific jurisdiction. A building owner or maintenance company personnel may have access to and right to alter all the information in the database 108 regarding the conveyance apparatuses he or she manages.

In step 206, maintenance program 106 receives from the user the name or identification of the conveyance apparatus to which the user wants to have access. At the same time or in subsequent order, the user also enters some parameters related to the conveyance apparatus. The parameters for the conveyance apparatus may differ in each transaction. For example, a technician may enter information such as inspection data, repair data, number of hours worked on a specific conveyance apparatus. A government official may enter a jurisdiction in which the specific conveyance apparatus is located. A building owner may enter any inquiry to gain access to the maintenance history or any violation of laws and regulations. Systems may use one or more logarithms algorithms for the transition of numbers.

Initially, a building owner or maintenance company may enter the initial conditions of the conveyance apparatuses. Each conveyance apparatus may have a unique proprietary software pre-loaded with its conditions. Beneficially, maintenance program 106 provides an algorithm that automatically translates the conditions in the format of the proprietary software into the format for the database 108 from various computing devices.

In step 208, maintenance program 106 identifies the type of the conveyance apparatus from the list of types of conveyance apparatuses stored in the database 108. Depending on different types, conveyance apparatuses may have a very broad spectrum of information. For example, the number and kind of items and parts to be inspected, repaired or replaced may be different for different types of conveyance apparatuses. In one embodiment, once the type of the conveyance apparatus is identified, the user is presented with the list of items and parts to inspect, repair or replace in real time so that the overall time for the user to spend on maintenance may be reduced.

All subscribers may receive "real-time" notifications on apparatus compliance and have access to historical information as requested. Information provided will create "proactive" maintenance options for subscribers who currently only have a "reactive" option to maintenance and public safety whereby the system uses an automatic algorithm method for real time notifications.

In step 210, maintenance program 106 retrieves from the database 108 the parameters available for the type of the conveyance apparatus previously identified in step 208. In step 212, maintenance program 106 generates one or more maintenance data. The maintenance data may include, but are not limited to, one or more of the following: inspection intervals for certain inspection items in compliance with governing laws and regulations, the estimated times required for a technician to complete the inspection items, repair notifications, compliance history of specific conveyance apparatuses, current compliance status of the conveyance apparatuses, and a compliance report for government officials.

A predetermined specially designed algorithm stored in the server 104 calculates the optimum, compliant maintenance intervals based on a variety of factors including, but not limited to, the serial number, manufacturer and model of the conveyance apparatus, the year produced, the year installed on the current location, the frequency of use, the jurisdiction in which the conveyance apparatus is located, and the environmental exposure. In some embodiments, big data information accumulated from the use of a specific model or other similar quality of conveyance apparatus enables a more accurate and efficient suggestion of inspection and repair schedules, because the knowledge of actual wear and tear of the parts in the conveyance apparatus becomes more accurate for preemptive protection.

To accomplish this computing environment 100 may utilize one or more trained machine learning algorithms that may be of any suitable form, and may include, for example, a neural network. A neural network may be software representing a human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight.

A neural network may include, for example, a convolutional neural network, a deep neural network, or a recurrent neural network. Previous overlapping repairs and reasons for maintenance and the conveyance apparatus, manufacturer, jurisdiction, and maintenance worker and means of communication may be received by the input layer whereby the interface layer may create a cluster with overlapping repairs and reasons for maintenance for similar conveyance apparatus, manufacturer, jurisdiction, and maintenance worker (such as when a predetermined amount of repairs or reasons for maintenance is correlated with another quality) been reached thus creating a variable that is then applied present reasons burnouts the user and the method of communication. The output layer then uses the variable to generate a response for determination of methods to prevent future maintenance issues by providing the user with a predictive analysis of what problems the conveyance apparatus might encounter in the future. This may be presented on a calendar interface whereby the problems and issues that the system may predict may be presented on the individual dates so the user may further visualize and plan accordingly. The predictive analysis then may be used to calculate a maintenance schedule with optimum maintenance intervals whereby the user may be scheduled to provide maintenance a predetermined amount of time before the predicted dates of the issues and problems such as a month.

Using the predictive analysis computing environment 100 may present a comprehensive guide of similar conveyance apparatuses whereby the user may be presented a generated search result with the data of previous conveyance apparatuses stored in the databases and search through these previous conveyance apparatuses such that they may see the problems and issues with them and how they were solved by the maintenance workers. Computing environment 100 may also provide various search filters to help users faster locate the type of conveyance apparatus or issue they are looking for. The search result may be displayed based on priority using a peeling algorithm whereby computing environment 100 defines a rule for selecting which nodes or edges to remove.

This may be based on properties like degree (number of connections), centrality measures, or other attributes specific to the nodes/edges. Computing environment 100 then iteratively removes nodes or edges that meet the selection criteria. After each removal, the graph structure changes, which might cause other nodes/edges to meet the criteria for removal in the next iteration. The process continues until a stopping condition is met. This could be a certain number of iterations, reaching a specific graph size, or the graph achieving a desired property (like disconnecting into subgraphs). After peeling, the remaining graph or the sequence of removals can be analyzed to understand the structure and properties of the original graph whereby the conveyance apparatuses that are most similar are presented in the search results or the results are prioritized whereby the results that were stripped last are presented first and results that were stripped earlier are presented later in descending order.

Depending on the level of authorization given to the user, the user may be allowed to obtain different kinds of maintenance data. For example, a government official may only be able to access compliance-related data. In this case, the predetermined algorithm stored in the server 104 populates the compliance-related data in a form required by the jurisdiction in which the conveyance apparatus is located. Difference forms required by different jurisdictions are stored in the database 108 so that the building owner or the maintenance company does not have to prepare different forms every time a government official from a different jurisdiction requires a compliance report. A union may be able to access the timesheet of each technician who worked on the conveyance apparatuses. A building owner and/or the maintenance company may have access to all of the above. The predetermined algorithm may also provide the building owner and/or the maintenance company alerts on upcoming maintenance schedules for specific conveyance apparatuses.

A non-exhaustive list of potential places where non-compliance issues may be found are, but not limited to, visual inspection of controller, inspecting the cleanliness of controller and components, control circuits, relaying, contacts and shunts inspection, inspecting the conditions of motor starter contacts, fuses, holders and overloads, inspecting the conditions of connections, control wiring, terminals, printed circuit boards and the cleanliness of machine room, maintaining oil in tank at proper levels, inspecting pressure tanks, valve, pump, vic fitting for leaks, belt condition and tension, code data plate, mechanical selector, sheaves and tape/cables, riding the car for proper operation, testing safety edge light ray detector and emergency stop switch alarm bell, inspecting floor level, testing communication system, inspecting signals and buttons, testing emergency light, testing door closing force, inspecting door operator, door clutch, restrictor, jack/packing, pit, buffers and the top of car, cleaning car top, inspecting door hangers, tracks, door rollers, up thrust, door interlocks, pick-up rollers, closer, sills and gibs, rails, hoists, the wear and insulation on traveling cables, limit switches, hoist ropes, sheaves, safeties, tags, lube, the cleanliness of bi-parting freight door/tracks, grease or oil guide rails, lude, grease bearings, indicating light, lanterns, gongs, hall button operations, mainline fuse/breaker/terminal connection, intercom system, relief valve setting, system pressure adjustment, hydraulic cylinder, pressurizing piping maintenance, terminal stopping device check, governors, over-speed switch, seal maintenance and oil buffer maintenance, testing firefighter and emergency operation, testing standby power operation, power operation of door system and emergency terminal speed reducing devices, inspecting low oil protection maintenance and flexible hose, replacing fitting assembly, maintaining pressure switch and pressure vessel, repairing roped hydros, maintaining overspeed valves, and the like.

In step 214, the maintenance data generated in step 212 is stored in the database 108. And in step 216, the retrieved archived parameters in step 210 are updated reflecting the user input parameters entered by the user. For example, after a technician finishes an inspection and/or repair task, the archived parameters are updated, including but not limited to, the conditions of the conveyance apparatus, the date of inspection/repair, the duration of such inspection/repair, and replaced parts.

What is claimed is:

1. A non-transitory computer readable medium storing a program with instructions providing a uniform conveyance maintenance system comprising:

a conveyance transport apparatus having one or more sensors configured to generate sensor data reflecting operating conditions of the conveyance transport apparatus;

a computing system configured for communication between one or more computing devices, a server, and the conveyance transport apparatus via a network;

a database on the server, in communication with the computing system, the database configured to store maintenance input data of the conveyance transport apparatus and track the maintenance input data in real time;

a translation algorithm stored on the server, the translation algorithm configured to automatically translate conditions in a format of proprietary software of the conveyance transport apparatus into a standardized format for the database, wherein the translation algorithm converts proprietary maintenance data that is incompatible between different service providers into the standardized format that enables computational enforcement operations on the conveyance transport apparatus;

one or more non-transitory computer readable program storage media storing instructions to instruct one or more processors, in communication with the computing system, wherein instructions are executed by the computing system to perform:

receiving, from the one or more sensors on the conveyance transport apparatus, sensor data and translating the sensor data into code suitable for the database;

identifying a conveyance type of the conveyance transport apparatus corresponding to conveyance identification from a list of conveyance types in the database;

receiving the maintenance input data of the conveyance transport apparatus in a proprietary format from a service provider maintaining the conveyance transport apparatus;

translating, by the translation algorithm, the maintenance input data from the proprietary format to the standardized format for the database;

categorizing the conveyance identification based on the type of conveyance apparatus, manufacturer, maintenance worker, and jurisdiction;

retrieving one or more archived parameters of the conveyance type from the database from one or more second conveyance transport apparatuses;

comparing, using the standardized format, the translated maintenance input data against jurisdictional compliance requirements stored in the database to generate a compliance determination;

generating one or more predictive maintenance compliance data by processing, via a trained neural network comprising an input layer, one or more internal layers, and an output layer, the input conveyance type, the maintenance input data, the sensor data, and the one or more archived parameters of the input conveyance type, wherein the one or more internal layers create a cluster based on correlations between overlapping repairs and reasons for maintenance from the one or more second conveyance transport apparatuses, and the output layer generates a predictive analysis of future maintenance issues for the conveyance transport apparatus based on the cluster;

in response to the compliance determination indicating a non-compliance condition, automatically transmitting, via the network, an enforcement signal from the server to the conveyance transport apparatus, wherein the enforcement signal renders the conveyance transport apparatus inoperative until one or more remediation criteria stored in the database are satisfied; and upon satisfaction of the one or more remediation criteria, automatically transmitting, via the network, a restoration signal from the server to the conveyance transport apparatus to render the conveyance transport apparatus operative.

2. The system of claim 1, wherein instructions are executed by the computing system are to further perform:

generating a calendar interface; and populating the calendar interface with predicted future compliance issues or problems in response to the one or more predictive maintenance compliance data.

3. The system of claim 2, wherein instructions are executed by the computing system are to further perform:

calculating future maintenance appointments in response to the predicted future compliance issues.

4. The system of claim 1, wherein the trained neural network receives at the input layer previous overlapping repairs and reasons for maintenance together with conveyance apparatus type, manufacturer, jurisdiction, and maintenance worker data, the one or more internal layers creating the cluster when a predetermined amount of repairs or reasons for maintenance is correlated with another quality, thereby generating a variable, and the output layer uses the variable to generate a response for determination of methods to prevent future maintenance issues by providing a predictive analysis of problems the conveyance transport apparatus is predicted to encounter.

5. The system of claim 1, wherein the GPS is used to identify a user as being physically within a predetermined distance from a location of the conveyance transport apparatus.

6. The system according to claim 5, wherein the enforcement signal is based on at least one violation citation, a particular geographic area of the computing device of the user, and a current time and date for the user.

7. The system of claim 1, wherein the maintenance input data is received from one or more sources selected from the group comprising of one or more union computing devices, insurance computing devices, technician computing devices, maintenance company computing devices, building owner computing devices, and government computing devices.

8. The system of claim 7, wherein the database stores A17.1 maintenance control criteria and applicable rules of local, state, and federal law.

9. The system of claim 1, wherein instructions are executed by the computing system are to further perform:

generating a search result having the one or more second conveyance transport apparatuses along with corresponding maintenance issues and solutions.

10. The system of claim 9, wherein instructions are executed by the computing system are to further perform:

ordering the search results corresponding to closest matches using a peeling algorithm, wherein the peeling algorithm defines a rule for selecting nodes or edges to remove from a graph based on degree or centrality measures, iteratively removes nodes or edges meeting the selection criteria, and continues until a stopping condition is met, wherein conveyance transport apparatuses that are most similar are presented first in the search results.

11. The system of claim 1, wherein each conveyance transport apparatus is assigned a unique alphanumeric identifier stored in the database, and wherein the jurisdictional compliance requirements stored in the database comprise different compliance forms required by different jurisdictions, and wherein the compliance determination is populated in a compliance form corresponding to the jurisdiction in which the conveyance transport apparatus identified by the unique alphanumeric identifier is located.

* * * * *